Patented Apr. 19, 1927.

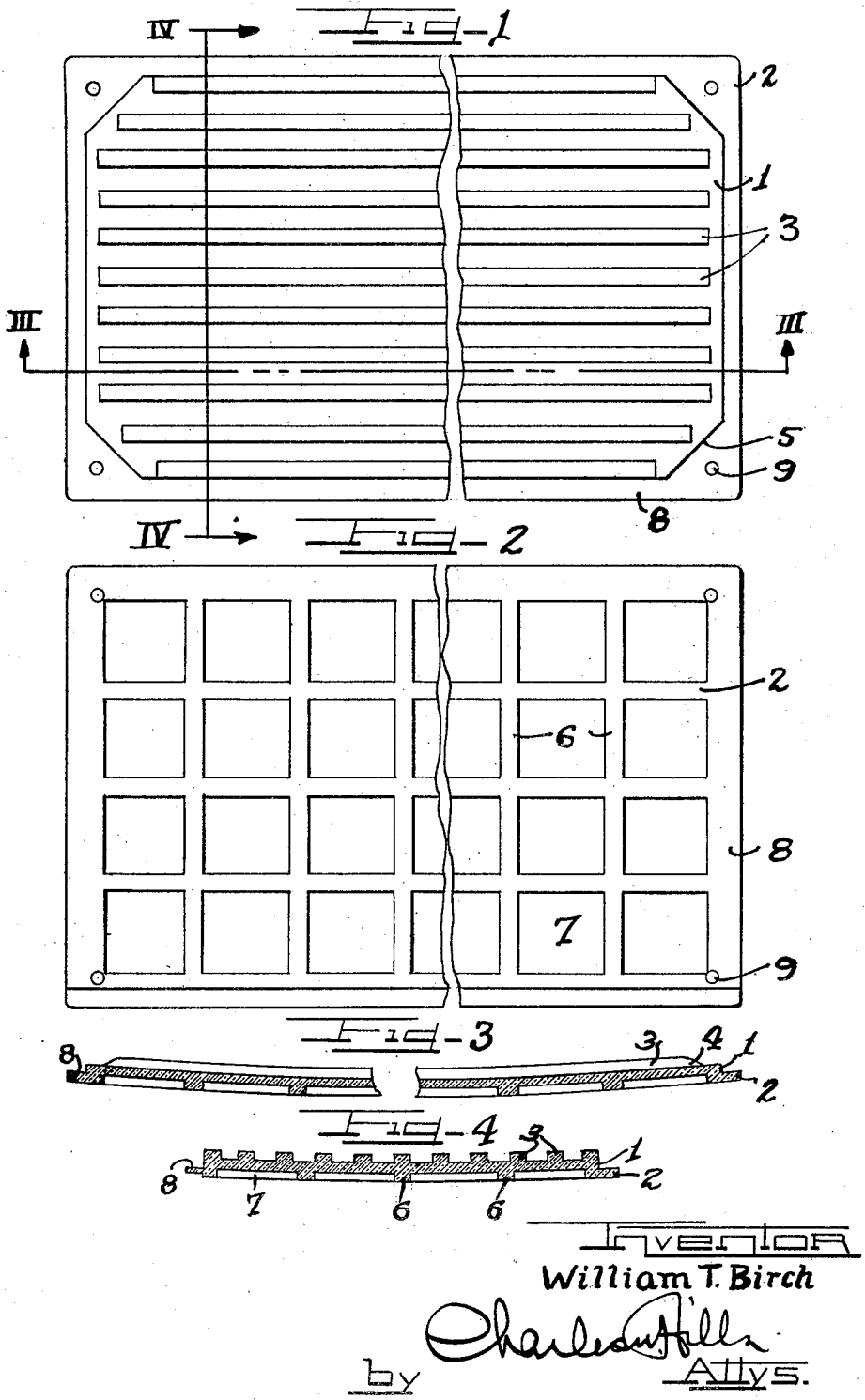

1,625,187

UNITED STATES PATENT OFFICE.

WILLIAM T. BIRCH, OF CHICAGO, ILLINOIS.

FOOT PAD.

Application filed May 13, 1925. Serial No. 29,936.

This invention relates to a foot pad, more particularly to a rubber or rubber composition pad for use on steps, or more especially in conjunction with the running board of an automobile. Rubber mats are quite generally used for that purpose, but heretofore such mats have shown a tendency on continued service to stretch and bulge upwardly in the center.

It is an object of this invention to provide a satisfactory foot pad made of rubber or rubber composition that will have a tendency at all times to hug the surface to which it is marginally secured.

It is a further object of this invention to provide a resilient pad having one surface that is contracted more than the other so that the pad assumes a slightly dished or concave form.

Other and further important objects of this invention will be apparent from the disclosures in the specification and accompanying drawings.

The invention (in a preferred form) is illustrated in the drawings and hereinafter more fully described.

On the drawings:

Figure 1 is a broken top plan view of a foot pad embodying the principles of my invention.

Figure 2 is a broken bottom plan view.

Figure 3 is a section taken on line III—III of Figure 1.

Figure 4 is a section taken on line IV—IV of Figure 1.

As shown on the drawings:

Referring now to the drawings, there is shown a foot pad or mat comprising an upper layer 1 made of relatively soft rubber and a lower layer 2 made of relatively hard rubber or rubber composition. These two layers are vulcanized together so as to be inseparable. The purpose of making the two layers of different composition will later appear. The upper layer 1 has a plurality of longitudinally spaced parallel ribs 3 raised slightly above the adjacent surface. Said ribs extend substantially the length of the mat. The ends of the ribs are bevelled or rounded as at 4 to prevent them from being scuffed up. The corners of the upper layer 1 are bevelled at 5 to fit the shape of a frame, which fits over the mat and holds the edges of the mat down against the step or running board as the case may be. The lower layer 2 of the mat comprises a latticework of integral ribs 6 joining each other at right angles to form recessed squares 7. This construction affords an extra amount of resilience to the mat. The lower layer is slightly larger than the upper layer, extending therebeyond on all sides to form a margin 8, over which a retaining frame lies when the mat is secured in position. Near the four corners and in this margin are holes 9, for receiving the screws which pass through the retaining frame and mat to secure them to the running board, or other surface.

I have found that if a layer of relatively soft rubber compound and a layer of relatively hard rubber compound, or in other words, rubbers of different composition, are vulcanized together, the softer rubber will contract more on cooling from the vulcanizing temperature than the harder rubber, since it has a greater coefficient of contraction. This fact I have made use of in making the foot pad herein illustrated and described.

It will be understood that rubber compositions or the like may be used, so I do not intend to limit the word "rubber" to the pure material, but contemplate that it may include any composition or compound thereof.

The top layer 1, having the greater coefficient of contraction, contacts more than the bottom layer 2 on cooling from the vulcanizing temperature. The result is that the top layer pulls the bottom layer into a curved form, so that the mat as a whole takes on a dished appearance, as best shown in Figures 3 and 4. Therefore, when the mat is enclosed at its margins 8 by a retaining device and secured by screws to a surface, the tendency is rather to hug the surface than to bulge away from it.

The longitudinal ridges 3 on the upper face of the mat serve for removing dirt from the feet. The dirt is easily brushed out from between the ribs by longitudinal strokes of a broom.

I am aware that many changes may be made and numerous details of construction may be varied through a wide range without departing from the principles of this invention, and I therefore do not purpose limiting the patent granted otherwise than necessitated by the prior art.

I claim as my invention:

A foot mat comprising two layers of rubber composition vulcanized together, the upper layer having a greater degree of contraction in all directions when cooling than the lower layer and the lower layer distorted by effect of the contraction of the upper layer, to produce a dished-form mat with the central zone of the lower layer in a lower horizontal plane than its marginal edges.

In testimony whereof I have hereunto subscribed by name.

WILLIAM T. BIRCH.